Jan. 14, 1958  R. L. MILKS, SR  2,819,617
POWER TAKE-OFF FOR VEHICLE WHEELS
Filed Sept. 2, 1955  2 Sheets-Sheet 1
Fig. 1
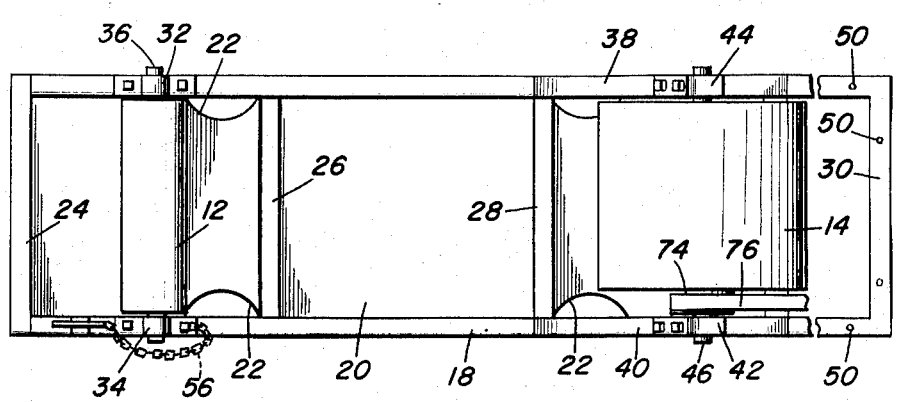
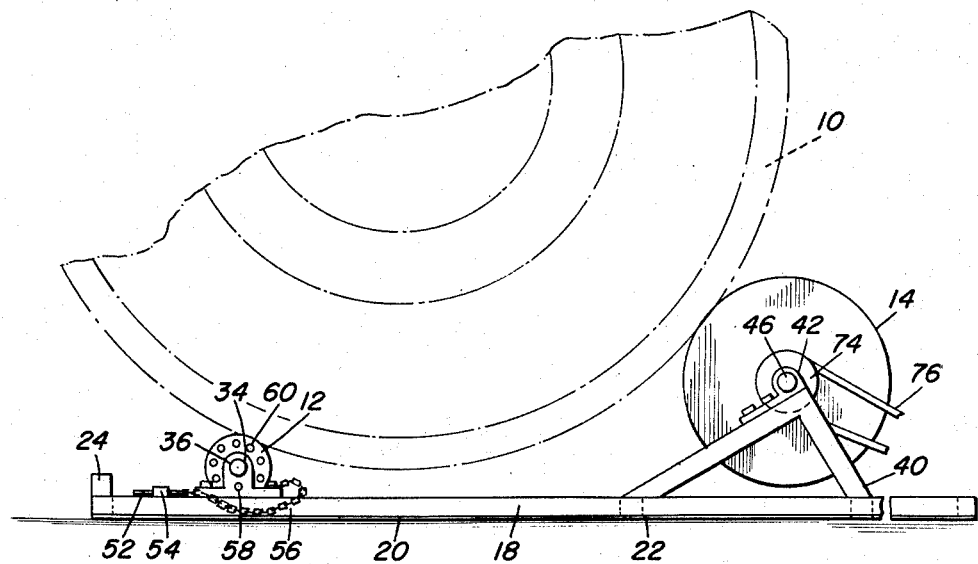
Fig. 2
Robert L. Milks, Sr.
INVENTOR.
BY *Clarence A. O'Brien*
*and Harvey B. Jackson*
Attorneys Jan. 14, 1958       R. L. MILKS, SR       2,819,617
POWER TAKE-OFF FOR VEHICLE WHEELS
Filed Sept. 2, 1955                    2 Sheets-Sheet 2

Robert L. Milks, Sr.
INVENTOR.

BY *Clarence A. O'Brien*
*and Harvey B. Jackson*
Attorneys

United States Patent Office 2,819,617
Patented Jan. 14, 1958

2,819,617

POWER TAKE-OFF FOR VEHICLE WHEELS

Robert L. Milks, Sr., Charlotte, N. C.

Application September 2, 1955, Serial No. 532,335

2 Claims. (Cl. 74—14)

This invention relates to power take-off devices, and particularly to a power take-off which derives its motive force from the drive wheels of an automotive vehicle.

An object of this invention is to provide a versatile power take-off device of the type wherein the rear wheel of a vehicle is supported between and on two rollers, one roller being used as a power roller, the power roll having operatively connected therewith means either to operate emergency equipment such as small generators, water pumps and others, or, to constitute an emergency piece of equipment, such as a winch or winding drum on which a cable, rope or the like is adapted to be wound in response to vehicle rear wheel actuation.

A further object of the invention is to provide a mechanically simplified device of the type where the rear wheel of the vehicle is supported on two spaced rollers, the base of the device constituting a support on which the auxiliary or emergency equipment is adapted to be bolted or otherwise secured, and having means by which the vehicle undercarriage may be lashed to the base.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top view of the power take-off device exemplifying one embodiment of the invention;

Figure 2 is a side view of the device in Figure 1, showing the same being used in connection with a fragmentary part of a vehicle wheel;

Figure 6 is a fragmentary plan view of a modification wherein the power take-off roller functions as a winding drum for a cable, rope or the like.

Figure 3:
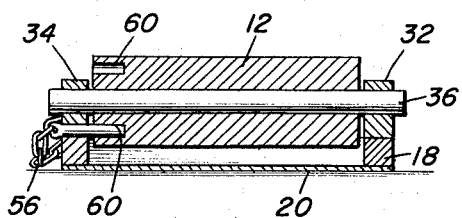
Figure 3 is a transverse sectional view of one of the rollers on the base of Figure 1.
Figure 4:
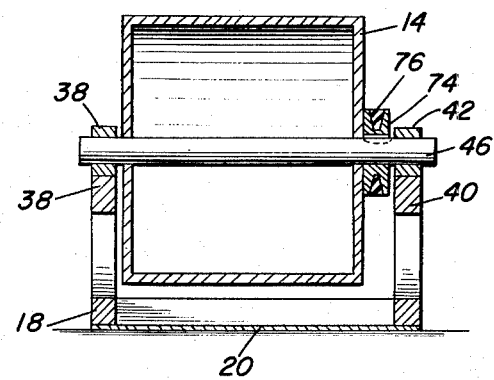
Figure 4 is a transverse sectional view of the other of the rollers.

In the drawings, there is a vehicle wheel 10 which is fragmentarily shown and illustrated as being in place upon a cradle formed by rollers 12 and 14 respectively. The base on which these rollers are supported consists of a rectangular frame 18 having a metal panel 20 welded or otherwise rigidly secured thereto, this panel having hand holes 22 in it. The functions of the hand holes 22 are to permit the base to be easily carried, to fasten the vehicle on the carriage by lashing it with rope, cable or the like passing through these hand holes, and anchoring the base to the ground or some other suitable supporting surface. Transverse members 24, 26, 28 and 30 forming a part of the rectangular frame 18, are welded or otherwise rigidly secured to the longitudinal side members of the frame. The front cross-member 24 is raised in order to aid in rolling the vehicle wheel 10 upon the roller 12 which is the smaller of the two rollers.

Saddle bearings 32 and 34 are affixed to the side members of the frame 18 adjacent to the raised cross-member 24 and accommodate roller shaft 36 that is approximately parallel to the raised cross-member 24. This shaft has roller 12 mounted on it.

Vertical supports 38 and 40 rise from the side members of frame 18 and have bearings 42 and 44 near the tops thereof. These bearings accommodate a shaft 46 to which roller 14 is fixed by suitable means, as welding or splining or utilizing a key or pin.

A portion of the frame 18 which protrudes beyond the roller 14 constitutes a support on which to accommodate a water pump, generator or other auxiliary and/or emergency equipment. For this purpose, means as apertures 50, are provided in the frame 18, and one or more of its cross-members in order to have bolts passed therethrough.

When rolling the vehicle wheel 10 on the device, it first encounters the raised cross-member 24 and then the roller 12. This roller has means associated with it for fixing it so that it will not roll while the vehicle wheel is moving thereover. Preferably, these means consist of a pin 52 releasably held in a clamp 54 on frame 18 and connected to the bearing 34 by a chain 56 or the like in order to prevent it from becoming lost. The pin, when locking the roller 12, is passed into an aperture 58 in the bearing 34 and one of the group of apertures 60 in roller 12. So long as the pin 52 is in apertures 58 and 60, the roller 12 cannot rotate, and the vehicle may be power driven on the device. As wheel 10 moves over the fixed roller 12, it contacts the periphery of the roller 14, the spacing of rollers 12 and 14 being such that the wheel is held elevated from the base and ground. Pin 52 is now removed and the vehicle wheel 10 is actuated, thereby rolling the roller 12 and also the roller 14.

Figure 5:
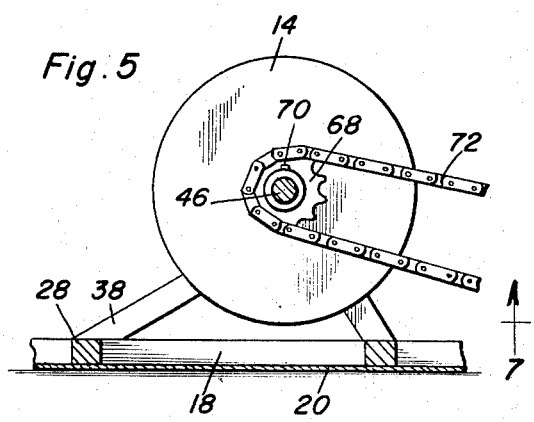
Figure 5 is a sectional view showing particularly a sprocket connected to the power take-off shaft, this sprocket being used to deliver power from the shaft to auxiliary or emergency equipment.

A variety of power take-off devices may be used in connection with the roller 14. For example, a sprocket (Figure 5) 68 may be placed alongside of roller 14 and keyed, splined or secured by other suitable ways, as by setscrew 70, to the shaft 46. When sprocket 68 or one like it, is employed, a chain, such as at 72 will be used to deliver power to the auxiliary or emergency equipment. Alternatively, in lieu of the sprocket 68, there may be a single pulley 74 with a belt 76 entrained therearound. Where heavier loads are involved, a double pulley may be used in place of the single pulley 74. In either case, it is preferred that the pulley be keyed or otherwise fixed to the shaft 46 by a quick-disconnect member.

Figure 6:
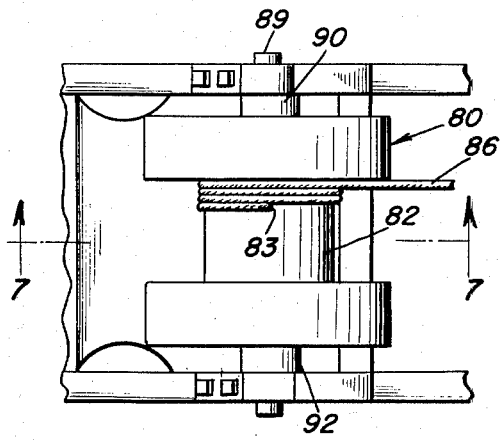
Figure 7:
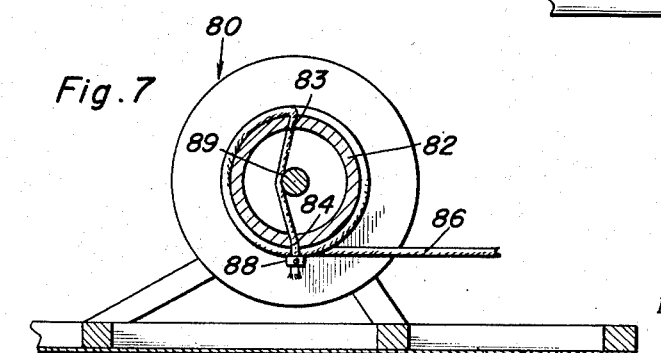
Figure 7 is a fragmentary sectional view taken on the line 7—7 of Figure 6.

A modification of the roller 14 is shown in Figures 6 and 7. Here, roller 80 has a reduced central portion 82 through which there are apertures 83 and 84 accommodating the end of a cable 86, rope or the like. Anchor 88 is on the extreme end of the cable 86 preventing it from being separated from the reduced central portion 82 of the roller 80. Accordingly, inasmuch as the roller 80 is fixed to its shaft 89, actuation of the roller 80 will cause the cable 86 to be wound on the roller reduced portion 82 whereby this roller functions as a drum. Spacers 90 and 92 are disposed on shaft 89 between the shaft bearings and the outer faces of the drum 80. In lieu of one or both of these spacers, sprocket 68 or pulley 74 may be used, these being connected to shaft 89 by keys, splines, pins or the like. It is understood, then, that the roller 80 may function as a means to rotate shaft 89 from the power derived from the vehicle wheel 10 and at the same time, wind cable 86 thereon, while simultaneously therewith the sprocket 68 or pulley 74 or both are being rotated with and by shaft 89.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A power take-off attachment for a vehicle wheel comprising a base, a first roller carried by said base, means including apertures in said roller and base and a pin operatively connected with said first roller for locking said first roller against rotation while the vehicle wheel is moving over said roller, a second roller spaced from said first roller and with said first roller forming a cradle on which to support the vehicle wheel, a shaft on which second roller is mounted, said second roller having a reduced portion intermediate the ends thereof, and endless flexible element secured to said reduced portion and windable thereon whereby said second roller functions as a winding drum.

2. The combination of claim 1 wherein said rollers are mounted in bearings, and supports rising from said base on which said bearings are secured.

References Cited in the file of this patent

UNITED STATES PATENTS

| | | |
|---|---|---|
| 2,496,787 | Fox | Feb. 7, 1950 |
| 2,712,109 | Graziose | June 28, 1955 |

FOREIGN PATENTS

| | | |
|---|---|---|
| 434,829 | Great Britain | Sept. 10, 1935 |